United States Patent
Smith, Jr. et al.

(10) Patent No.: US 12,182,087 B2
(45) Date of Patent: Dec. 31, 2024

(54) SYSTEM AND METHOD FOR REDUCING FEATURE CALCULATIONS

(71) Applicant: International Business Machines Corporation, Armonk, NY (US)

(72) Inventors: Donnie Allen Smith, Jr., Raleigh, NC (US); Willie Robert Patten, Jr., Hurdle Mills, NC (US); Chintan Rajyaguru, Cary, NC (US); Jeffrey N. Eisen, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/400,709

(22) Filed: Aug. 12, 2021

(65) Prior Publication Data
US 2023/0052480 A1    Feb. 16, 2023

(51) Int. Cl.
G06F 16/00 (2019.01)
G06F 16/215 (2019.01)
G06F 16/22 (2019.01)
G06F 16/23 (2019.01)

(52) U.S. Cl.
CPC ........ *G06F 16/215* (2019.01); *G06F 16/2255* (2019.01); *G06F 16/2358* (2019.01)

(58) Field of Classification Search
CPC . G06F 16/215; G06F 16/2255; G06F 16/2358
See application file for complete search history.

(56) References Cited

U.S. PATENT DOCUMENTS

| | | | |
|---|---|---|---|
| 8,250,325 B2 | 8/2012 | Holdman et al. | |
| 9,996,269 B2 | 6/2018 | Gusev | |
| 11,283,690 B1* | 3/2022 | Mosier | H04L 41/22 |
| 2022/0076164 A1* | 3/2022 | Conort | G06N 20/00 |

(Continued)

FOREIGN PATENT DOCUMENTS

WO    WO-2013116806 A1 *    8/2013    ........... G06F 16/164

OTHER PUBLICATIONS

Kobert et al., "Efficient detection of repeating sites to accelerate phylogenetic likelihood calculations," Systematic biology 66.2 (2017), pp. 205-217.

(Continued)

*Primary Examiner* — Diedra McQuitery
(74) *Attorney, Agent, or Firm* — Scully, Scott, Murphy & Presser, P.C.

(57) ABSTRACT

A computer-implemented system, platform, computer program product, and/or method for reducing data processing that includes identifying data properties used to generate features used as input to data analytic models; associating the data properties used to generate the features to corresponding features; determining whether an incoming data record is a previously processed data record; determining, in response to an incoming data record being a previously processed data record, whether the incoming data record matches the previously processed data record; identifying data properties in the incoming data record that have changed; determining features associated with the data properties in the incoming data record that have changed; and generating the features associated with the data properties in the incoming data record that have changed.

15 Claims, 10 Drawing Sheets

(56) References Cited

U.S. PATENT DOCUMENTS

2022/0292525 A1* 9/2022 Ash ................... G06F 16/951
2022/0309450 A1* 9/2022 Mishra ................ G06N 20/00

OTHER PUBLICATIONS

Izquierdo-Carrasco et al., "Algorithms, data structures, and numerics for likelihood-based phylogenetic inference of huge trees", BMC Bioinform., 2011, 14 pages, 12:470.

Hu et al., "Multi-AGV dispatching and routing problem based on a three-stage decomposition method [J]", Mathematical Biosciences and Engineering 17.5, Jul. 2020, pp. 5150-5172.

Shi et al. "Maximal influence spread for social network based on MapReduce." International Conference of Young Computer Scientists, Engineers and Educators. Springer, Berlin, Heidelberg, 2015. pp. 128-136.

Fan et al. "Popularity and gain based caching scheme for information-centric networks." International Journal of Advanced Computer Research 7.30 (2017): pp. 71-80.

Wu et al., "Location-based Data Analysis of Visitor Structure for Recreational Area Management", Travel and Tourism Research Association: Advancing Tourism Research Globally, 2020, 18 pages.

* cited by examiner

| Record ID | |
|---|---|
| Gender | ... |
| Age | ... |
| Height | ... |
| Weight | ... |
| Blood Pressure | ... |
| Resting Heart Rate | ... |
| Income | ... |
| Race | ... |

FIG. 4

| | |
|---|---|
| Gender | → Feature A |
| Age | |
| Height | → Feature B |
| Weight | |
| Blood Pressure | → Feature C |
| Resting Heart Rate | → Feature D |
| Income | → Feature E |
| Race | → Feature F |

FIG. 5

| | |
|---|---|
| Blood Pressure | → Feature C |
| Resting Heart Rate | → Feature D |

FIG. 6

Record ID: 1111 — 212'

| Property | Value | Time Stamp |
|---|---|---|
| Record ID | 1111 | 2020-08-21 08:29:17:172 |
| Gender | M | 2019-06-21 11:29:17:172 |
| Age | 35 | 2020-08-21 08:29:17:172 |
| Height | 72.5 | 2019-06-21 11:29:17:172 |
| Weight | 195 | 2020-08-21 08:29:17:172 |
| Blood Pressure | 120/80 | 2020-08-21 08:29:17:172 |
| Resting Heart Rate | 50 | 2020-08-21 08:29:17:172 |
| Income | 80 | 2020-08-21 08:29:17:172 |
| Race | White | 2019-06-21 11:29:17:172 |

FIG. 11

Record ID: 1111 — 212'

| Property | Value | Time Stamp |
|---|---|---|
| Record ID | 1111 | 2019-06-21 11:29:17:172 |
| Gender | M | 2019-06-21 11:29:17:172 |
| Age | 35 | 2019-06-21 11:29:17:172 |
| Height | 72.5 | 2019-06-21 11:29:17:172 |
| Weight | 195 | 2019-06-21 11:29:17:172 |
| Blood Pressure | 120/80 | 2019-06-21 11:29:17:172 |
| Resting Heart Rate | 50 | 2019-06-21 11:29:17:172 |
| Income | 80 | 2019-06-21 11:29:17:172 |
| Race | White | 2019-06-21 11:29:17:172 |

⇒ Processed Record Data Store (170)

FIG. 12

SYSTEM AND METHOD FOR REDUCING FEATURE CALCULATIONS

FIELD

The present application relates generally to information handling, data processing, and/or data analytics, and more particularly to systems, platforms, computer program products, and/or methods for loading and updating data records, including reducing the work-load associated with updating data records and feature calculations for use with, for example, data analytic models.

BACKGROUND

With recent advancement of information technology and wide use of the Internet to store and process information, more and more demands are placed on the acquisition, processing, storage, and analyzing information and data by computing systems. As information and data which is being stored has increased dramatically it is increasingly important to be able to process and analyze the data efficiently. It would be advantageous to reduce the processing and calculations undertaken to analyze data on computer implemented data systems.

SUMMARY

The summary of the disclosure is given to aid understanding of, and not with an intent to limit, the disclosure. The present disclosure is directed to a person of ordinary skill in the art. It should be understood that various aspects and features of the disclosure may advantageously be used separately in some circumstances or instances, or in combination with other aspects, and/or embodiments of the disclosure in other circumstances or instances. Accordingly, variations and modifications may be made to the system, platform, their architectural structure, the computer program product, and/or their method of operation to achieve different effects. In this regard it will be appreciated that the disclosure presents and describes one or more inventions, and in aspects includes numerous inventions as defined by the claims.

One or more embodiments of a system, platform, computer program product, and/or method is disclosed for reducing and/or restricting feature calculations, including in an embodiment determining what features associated with data attributes and/or data properties that need updating, and in an aspect reducing and/or restricting feature calculations to data properties that have changed, and in an aspect, data properties that are associated with features. In one or more approaches a system, platform, computer program product, and/or method of processing data is disclosed that includes: identifying one or more data properties used to generate one or more features used as input to one or more data analytic models; associating the one or more data properties used to generate the one or more features to one or more corresponding features; determining whether an incoming data record is a previously processed data record; determining, in response to an incoming data record being a previously processed data record, whether the incoming data record matches the previously processed data record; identifying, in response to the incoming data record not matching the previously processed data record, one or more data properties in the incoming data record that have changed; determining, in response to identifying one or more data properties in the incoming data record that have changed, one or more features associated with the one or more data properties in the incoming data record that have changed; and generating the one or more features associated with the one or more data properties in the incoming data record that have changed. The system, platform, computer program product and/or method in one or more aspects further includes updating the previously processed data record with the one or more data properties that have changed; storing, in response to an incoming record not being a previously processed data record, the incoming data record as a new record; generating one or more features for the stored new record; and/or discarding, in response to the incoming data record matching a previously processed data record, one of the incoming data record or the previously processed data record.

In one or more approaches, the system, platform, computer program product, and/or method further includes generating only the one or more features associated with the one or more data properties in the incoming data record that have changed. In one approach, determining whether an incoming data record is a previously processed data record includes searching previously processed data records for a unique record identifier that matches a unique record identifier of the incoming data record. In an aspect, searching previously processed data records for a unique record identifier that matches a unique record identifier of the incoming data record includes comparing the unique record identifier of the incoming data record to the unique record identifiers of previously processed data records. In one or more embodiments, the system, platform, computer program product, and/or method further includes generating a hash value for a plurality of data properties in the incoming data record and a cumulative hash value associated with each of the hash values generated for the plurality of data properties in the incoming data record, and wherein determining whether the incoming data record matches a previously processed data record further comprises determining whether the cumulative hash value of the incoming data record is the same as a cumulative hash of the previously processed data record; and/or generating a hash value for each of all the data properties in the incoming data record and a cumulative hash value associated with all the hash values for all the data properties in the incoming data record. In an approach, identifying one or more data properties in the incoming record that have changed comprises determining, in response to the cumulative hash value of the incoming data record not being the same as the cumulative hash of the previously processed data record, the hash values of any of the plurality of data properties in the incoming data record that are different than the hash value of any of the corresponding data properties in the previously processed data record, wherein determining that the hash values of any of the plurality of data properties in the incoming data record are different than the hash value of any of the corresponding data properties in the previously processed data record, identifies the one or more data properties in the incoming data record that have changed.

Determining one or more features associated with the one or more data properties that have changed in an embodiment includes checking the one or more data properties in the incoming data record that have changed for correspondence to the one or more data properties associated with the one or more corresponding features, and generating a list of one or more corresponding features associated with the one or more data properties that have changed. The system, platform, computer program product, and/or method in an aspect includes providing a timestamp for the incoming data record and a timestamp for a plurality of data properties in the incoming data record, and wherein determining whether the incoming data record matches the previously processed data record further comprises determining whether the timestamp of the incoming data record is the same as a timestamp of the previously processed record. Identifying one or more data properties in the incoming data record that have changed in an embodiment includes determining, in response to the timestamp of the incoming data record not being the same as a timestamp of the previously processed data record, the timestamps of any of the plurality of data properties that are different than the timestamps of the corresponding properties in the previously processed data record, wherein the timestamps of the plurality of data properties that are different than the timestamps of the corresponding properties in the previously processed data record identifies the one or more data properties in the incoming record that have changed.

In an embodiment, the computer programming product includes instructions that, when executed by at least one hardware processor, configure the at least one hardware processor to perform one or more of the steps, tasks, and/or functions described herein, and the system and/or platform in an embodiment includes a non-transitory memory storage storing program instructions, and a hardware processor having circuitry and logic to execute said program instructions, wherein the hardware processor is in communication with said memory storage device and in response to executing said program instructions, the system and/or platform is configured to perform the steps, tasks, operations, and/or functions described herein.

The foregoing and other objects, features, and/or advantages of the invention will be apparent from the following more particular descriptions and exemplary embodiments of the invention as illustrated in the accompanying drawings.

BRIEF DESCRIPTION OF THE DRAWINGS

The various aspects, features, and embodiments of a system, platform, computer program product, and/or method to determine what features, e.g., for data analytic models, to recalculate and update will be better understood when read in conjunction with the figures provided. Embodiments are provided in the figures for the purpose of illustrating aspects, features, and/or various embodiments of the systems, platforms, computer program products, and/or methods, but the claims should not be limited to the precise arrangement, structures, features, aspects, systems, platforms, tools, modules, functional units, assemblies, subassemblies, circuitry, embodiments, instructions, programming, methods, processes, techniques, and/or devices shown, and the arrangements, structures, features, aspects, systems, platforms, tools, modules, functional units, assemblies, subassemblies, circuitry, embodiments, instructions, programming, methods, processes, techniques, and/or devices shown may be used singularly or in combination with other arrangements, structures, features, aspects, assemblies, subassemblies, systems, platforms, tools, modules, functional units, circuitry, embodiments, instructions, programming, methods, techniques, processes, and/or devices.

FIG. 4 illustrates an example of a portion of data properties and/or data attributes in a portion of a representative record according to an embodiment of the present disclosure;

FIG. 5 illustrates an example of data properties and/or data attributes mapped to associated features according to an embodiment of the present disclosure;

FIG. 6 illustrates an example of a feature list according to an embodiment of the present disclosure;

FIG. 11 illustrates providing timestamps of data properties and/or data attributes of a record according to an embodiment of the present disclosure;

FIG. 12 illustrates storing timestamps of a record and data properties in a Processed Data Record Store according to an embodiment of the present disclosure.

DETAILED DESCRIPTION

The following description is made for illustrating the general principles of the invention and is not meant to limit the inventive concepts claimed herein. In the following detailed description, numerous details are set forth in order to provide an understanding of the system, platform, tool, computer program product, method, and/or techniques for determining what features need to be recalculated and updated, including in an aspect reducing and/or restricting feature calculations to data properties and/or attributes that have changed to reduce the time and computations required to complete the feature calculations, however, it will be understood by those skilled in the art that different and numerous embodiments of the system, platform, tool, computer program product, and/or their method of operation may be practiced without those specific details, and the claims and disclosure should not be limited to the arrangements, structures, systems, assemblies, subassemblies, platforms, tools, modules, functional units, circuitry, embodiments, features, aspects, instructions, programming, processes, methods, techniques, and/or details specifically described and shown herein. Further, particular features, aspects, arrangements, structures, systems, assemblies, subassemblies, platforms, tools, modules, functional units, circuitry, embodiments, instructions, programming, processes, methods, techniques, details, etc. described herein can be used in combination with other described features, aspects, arrangements, structures, systems, assemblies, subassemblies, platforms, tools, modules, functional units, circuitry, embodiments, instructions, programming, processes, methods, techniques, details, etc. in each of the various possible combinations and permutations.

The following discussion omits or only briefly describes conventional features of information processing systems and data networks, platforms, tools, computer program products, including electronic data analytic programs, and/or methods configured and adapted to perform feature calculations as part of or for use by data analytic models, modules, and/or programs, which should be apparent to those skilled in the art. It is assumed that those skilled in the art are familiar with data processing and data analytics including large scale data processing/analytics systems (also referred to as information/data processing systems) and their operation, and the application of data analytics and data analytic models, modules, tools, and/or programs. It may be noted that a numbered element is numbered according to the figure in which the element is introduced, and is typically referred to by that number throughout succeeding figures.

Figure 1:
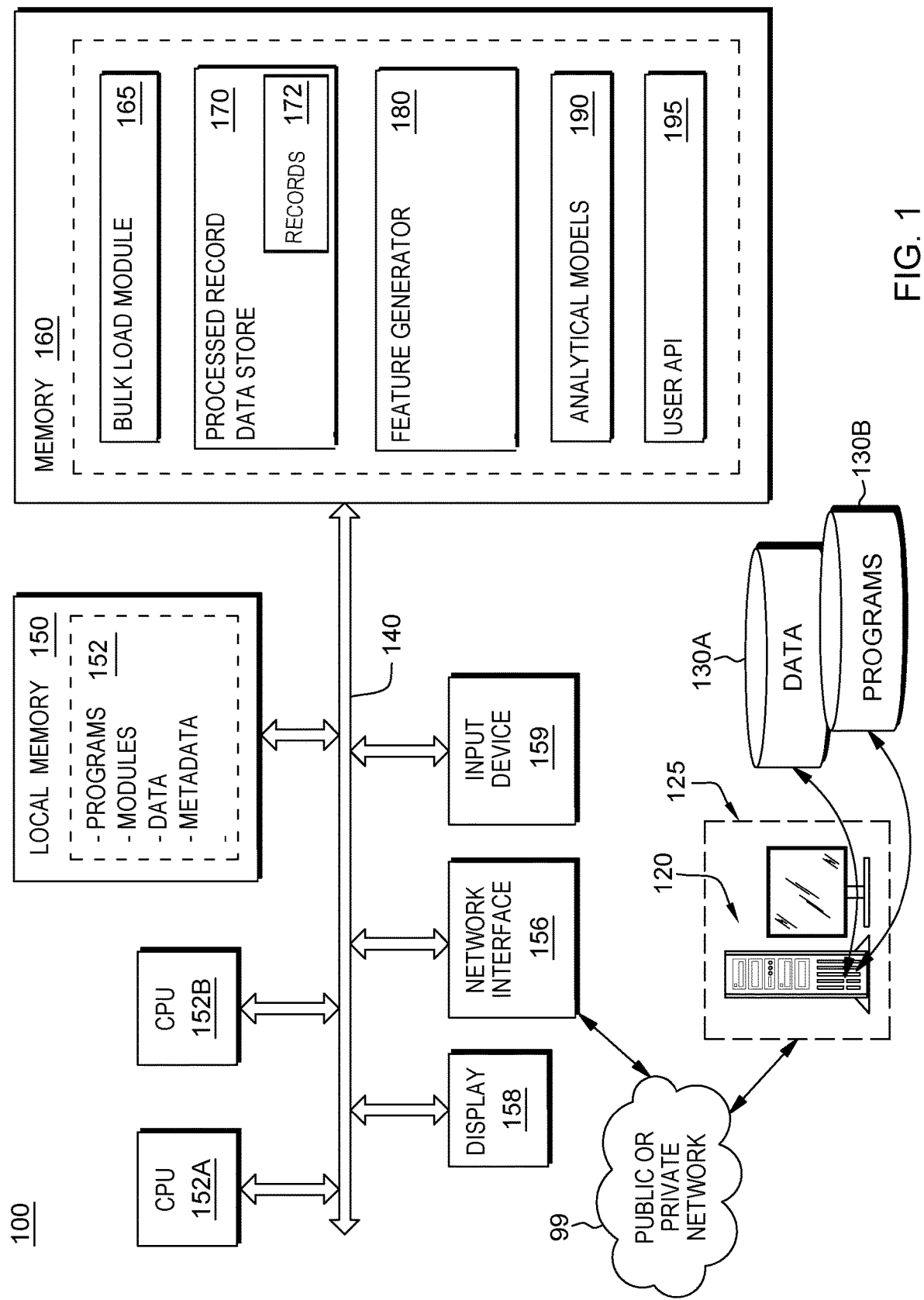
FIG. 1 schematically shows an exemplary computer system/computing device which is applicable to implement one or more embodiments of the according to an embodiment of the present disclosure.

FIG. 1 illustrates an example computer system functioning as an electronic assessment tool 100 implementing analytic models, for example in the domain of financial services, insurance claims processing, medical information processing, and/or other industries. In one or more embodiments, such a system tool 100 may be employed by or for a medical, financial, insurance and/or other entity, company, or institution who may receive data, including data updates and uploads. For example, the medical records of patients of a physician can be updated during and/or following a patient visit and/or delivery of medical test results. While the majority of the discussion pertains to medical records, other examples can include updating financial transactions of customers, updating insurance claims, etc.

The assessment tool 100, also referred to as a platform 100 and/or computing system 100, according to one embodiment, is an information processing system configured to run data analytical software applications and models 190. In some aspects, computing system 100 may include, for example, distributed cloud computing environments, main frame computers, servers, thin clients, thick clients, multiprocessor systems, microprocessor-based systems, network PCs, minicomputer systems, personal computers, desktop computers, laptops, tablets, smart devices, smart phones, handheld processing devices, set top boxes, programmable consumer electronics, or any other similar computing device, an embodiment of which is described in more detail in FIG. 6.

Computing system 100 according to an embodiment as shown in FIG. 1 includes one or more hardware processors 152A, 152B (also referred to as central processing units (CPUs)), a memory 150 local to the processors, main memory 160 (e.g., for storing an operating system, application program interfaces (APIs) and program instructions), a network interface 156, a display device 158, an input device 159, interconnect and/or communication channel 140, and any other features common to a computing device. In one or more aspects, computing system 100 may, for example, be any computing device that is configured to communicate with one or more networks and/or websites 125 including a cloud-based or web-based server 120 over a public or private communications network 99. For instance, website 125 and/or web-based server 120 can be for or attached to remote systems of a medical provider, insurance company, and/or financial institution, for example, that records/stores information, e.g., medical records of numerous patients, multiple insurance claims, and/or numerous financial transactions occurring between numerous parties (entities). Such data may be stored in a data storage 130A along with associated programs stored in data storage 130B. Data storage 130A and/or 130B is an example of a remote storage device, e.g., a database accessible via a remote network connection for input into system 100.

In the embodiment depicted in FIG. 1, processors 152A, 152B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 152A, 152B are configured to execute instructions as described below. These instructions may be stored, for example, as programs and/or programmed modules in local memory 150, main memory 160, or an associated memory storage device (not shown).

With respect to configuring the computer system as an assessment tool 100 for processing analytical models and performing data analytics, the local memory 150 may be configured for storing programs, modules, data, information, records, and associated meta-data 152, or portions thereof as needed. Memory 150 may include, for example, non-transitory computer readable media in the form of volatile memory, such as random-access memory (RAM) and/or cache memory or others. Memory 150 can receive programs, modules, data, information, records, and associated data from, for example memory 160, or over network interface 156. Memory 150 may include, for example, other removable/non-removable, volatile/non-volatile storage media. Network interface 156 is configured to transmit and receive data or information to and from a network and/or web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 158 may include a liquid crystal display (LCD), an e-paper/e-ink display, an organic LED (OLED) display, or other similar display technologies. In an aspect, display 158 may be touch-sensitive and may also function as an input device. Input device 159 may include, for example, a keyboard, a mouse, a touch-sensitive display, a keypad, a microphone, or other similar input devices or any other input devices that may be used alone or together to provide a user with the capability to interact with the computing device 100.

Memory 160 of computer system 100 in one or more embodiments stores processing modules that include programmed instructions adapted to run analytical models 190 and/or other modules to load, process, analyze, and assess data. By way of non-limiting examples only, memory 160 may include a non-transitory medium for storing data, information, and/or instructions, including a portable computer diskette, a hard disk, Solid-State Drive (SSD), a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In an embodiment, one of the programmed processing modules stored at the associated memory 160 includes a Bulk Load Module 165 that provides instructions and logic for operating circuitry to access/read/load/process large amounts of data (e.g., parties, patients, medical records, claims/accounts, transaction data, record updates) preferably for use by other modules (e.g., the analytical models 190) that can further process and analyze the data. In one or more embodiments, the input data for Bulk Load Module 165 comprises patient records, parties, accounts, claims, transactions, etc., and updated data and information on the same.

In an embodiment, memory 160 includes a Processed Record Data Store 170 (also referred to as a Data Record Store 170 or Record Store Module 170) that provides instructions and logic for operating circuitry to store Records 172. In most instances, large amounts of data are input and processed by the Bulk Load Module 165, and the data is processed and stored in the Processed Record Data Store 170 as Records 172. Typically records 172 are ingested, loaded, and/or passed to system 100 with a unique record identifier (Record ID).

Memory 160 in one or more embodiments further includes a Feature Generator 180 to generate features, and in an aspect includes, for example, a mathematical compute engine to compute or generate features. In an embodiment, the Feature Generator 180 provides and/or includes instructions and logic for operating circuitry to generate and/or compute features as described herein, that can, in an aspect, be used by other modules, for example analytical models 190. Feature Generators and mathematical compute engines are well known in the art.

In one or more further embodiments, memory 160 further includes a supervisory program having instructions for configuring the system 100 to call one or more, and in an embodiment all, of the program modules. In an embodiment, the supervisory program calls methods and provides application program interfaces (APIs) for running and operating the Bulk Load Module 165, the Processed Record Store 170, the Feature Generator 180, and/or Analytical Models 190. At least one application program interface (API) 195 is invoked in an embodiment to receive input data from a user, for example to run one or more of the platforms, tools, and/or modules.

In performing data analytics, using for example analytical models, systems generally collect and update lots of information, and in many instances not all the information is useful for the specific data analytics being performed. In addition, it is often the case that most data in data analytic systems don't change, or at least the pertinent data for specific data analytics, e.g., for the one or more pertinent analytical models, does not change. In that regard, processing all that data and performing feature calculations for all the data updates can take up processing resources, can be resource intensive, can be cumbersome, decrease system performance, consume unnecessary power, and/or be time consuming. It would be advantageous to reduce the time and computations required to process data and perform the necessary feature calculations for use by the analytic models.

Data analytical models 190 usually require certain data to be filtered, selected, and transformed into a certain format, generally referred to as a feature set. Typically, as part of running data analytic models, one or more filters and/or one or more Transform Functions generate one or more feature sets that are input and/or submitted to the one or more analytical models 190. The one or more features or feature sets are data that has been filtered, selected, and transformed into a form for use by and that is inputted into the selected analytical model 190. In other words, the various analytical models 190 desire and/or require certain data in a certain format in order to run and generate an output. The analytical models 190, in one or more embodiments receive input as features or a feature set and will output or generate, depending upon the amount of processing performed by the analytical model 190, insights, further features, alerts, and/or values (data) that can, for example, be further processed to create insights or alerts. In one or more embodiments, if new data is uploaded, all the calculations and processing to generate the features and feature sets that are input into the analytical models typically are all regenerated. Regenerating all the features and features sets as discussed can be inefficient.

In one or more embodiments, a system, platform, tool, computer program product, and/or method is disclosed to restrict and/or reduce feature calculations, and in an approach reduce and/or restrict feature calculations to a subset of data updates, and in an aspect to only the data that changes, and in a further aspect to only the data that changes that are associated to relevant feature calculations for the desired analytical model, preferably to reduce the time and computations required for the feature calculations for the desired analytic models. In one or more embodiments, one or more systems, platforms, tools, computer program products, and/or methods are disclosed to determine what features need to be recomputed and/or recalculated, and in an aspect reduces the feature calculations that need updating. Several variations are described, where in one or more embodiments hash values and/or timestamps are used for processing and reducing and/or restricting the feature update calculations.

Figure 2:
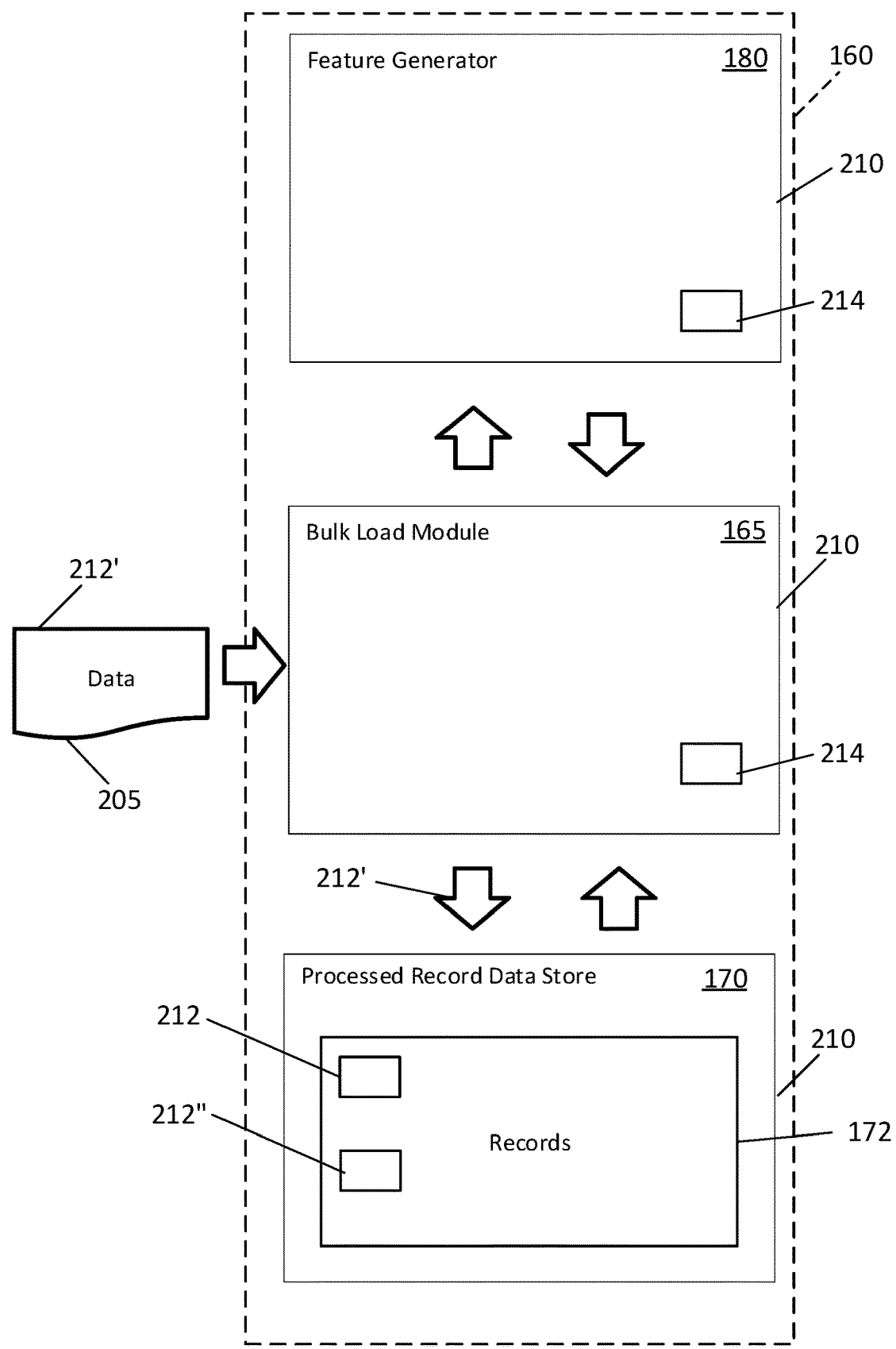
FIG. 2 schematically illustrates the interaction among some of the different programs and/or modules in an embodiment of the present disclosure.

FIG. 2 discloses further details regarding the interactions and operations of the various modules, for example, Bulk Load Module 165, Processed Record Data Store 170, and Feature Generator 180. For purposes of clarity FIG. 2 discloses functional units or modules 210 in Memory 160 while eliminating some of the details, specifics, and architecture disclosed in system 100 in FIG. 1. The functional units 210, and/or processing units associated with the functional units 210, contain instructions and/or logic for operating circuitry to perform the respective functions and operations of the functional units 210. For example, the functional units 210 contain instructions and/or logic executable by circuitry, for example in a processor, computer, server, etc., to perform one or more of the process steps performed by the respective functional unit 210.

In FIG. 2 data is received and/or uploaded to Bulk Load Module 165. During processing, incoming records 212' typically having a unique record identifier (Record ID) are loaded, ingested, and/or passed to Bulk Load Module 165. In an approach, it is determined whether an incoming record 212' already exists, and if in one or more embodiments it is determined that an incoming record 212' does not exist, e.g., was not stored in the Processed Record Data Store 170, the incoming record 212' typically containing the same unique record identification (Record ID) is stored as a new record 212" (e.g., becomes a record 212) in Records 172 in Processed Record Data Store 170. In one or more aspects, the Record ID is used to determine whether an incoming record 212' already exists in the Processed Record Data Store 170.

In one or more embodiments, the Bulk Load Module 165 sends the incoming record 212' (e.g., the new record 212") along with a list 214 of features (e.g., a feature set) to the Feature Generator 180 to generate the features identified on the feature list 214.

In an approach, if the incoming record 212' is found in the Records 172 in the Processed Record Data Store 170, e.g., the incoming record 212' has a corresponding record 212 that already exists, the Bulk Load Module 165 makes several comparisons to determine if further processing is required. If it determined that an incoming record 212' is different than the corresponding record 212 already processed, e.g., the previous record 212 has changed, then according to an embodiment, the Bulk Load Module 165 determines which properties in the incoming record 212' changed. The Bulk Load Module 165 then will use a data property to feature mapping to determine which features need to be recalculated because those features are based upon property values that have changed. The Bulk Load Module 165 creates a list of the features (referred to as a Feature List 214) that need to be recalculated and sends the Feature List 214 to the Feature Generator 180 for further processing, including for example to recalculate the features identified on the Feature List. The incoming record 212', which is different than the previous record 212 (e.g., contains new data), is stored in Records 172 in the Processed Record Data Store 170.

Figure 3:
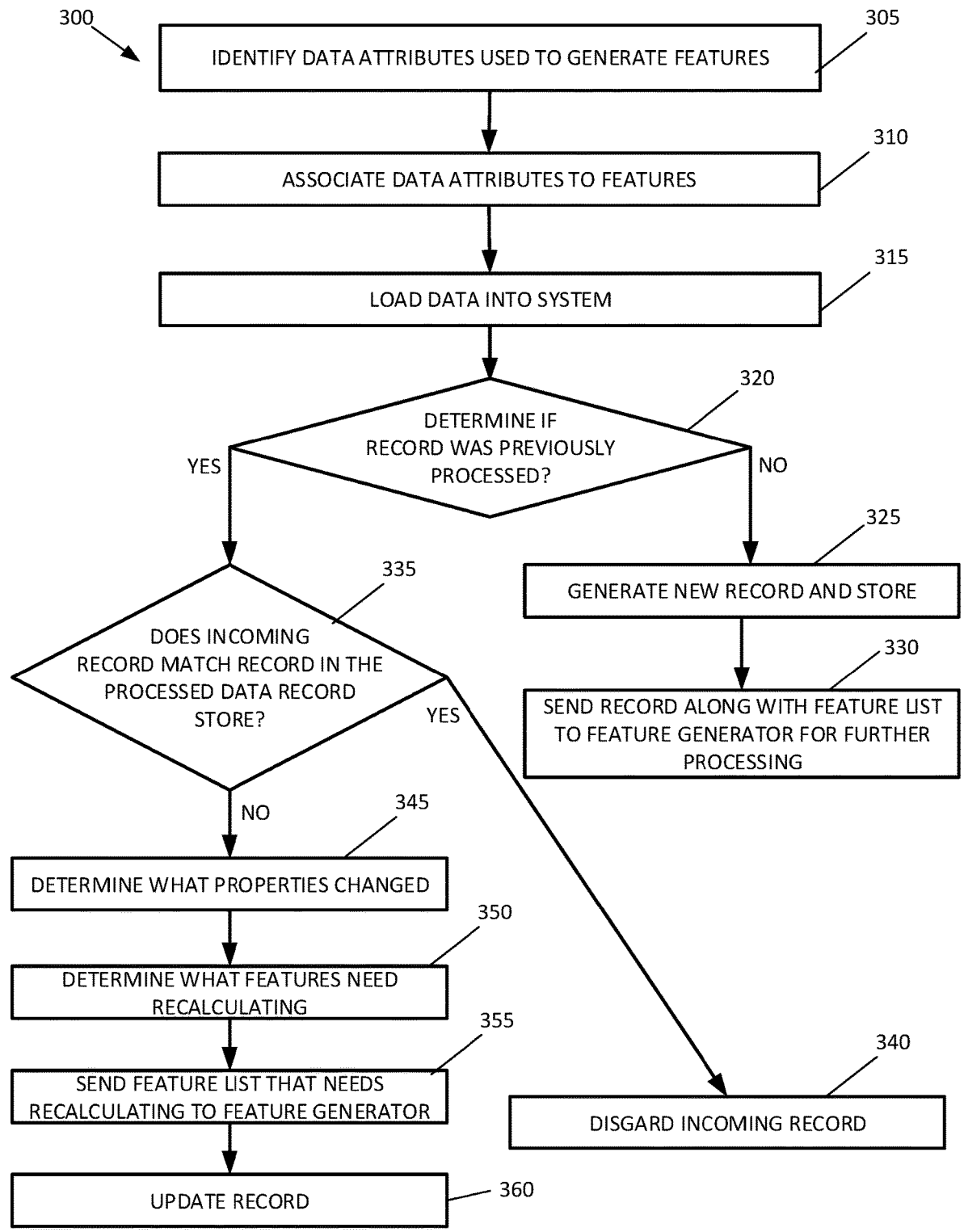
FIG. 3 illustrates a diagrammatic flowchart of a method of reducing feature calculations according to an embodiment of the present disclosure.

FIG. 3 is an exemplary flowchart in accordance with one embodiment illustrating and describing a method 300 of processing data, including update data, and in an aspect restricting and/or reducing the feature calculations to be undertaken to data properties that have changed, and in an approach to the data properties that have changed that are pertinent to the feature calculations for the desired and/or pertinent analytical model(s). While the method 300 is described for the sake of convenience and not with an intent of limiting the disclosure as comprising a series and/or a number of steps, it is to be understood that the process 300 does not need to be performed as a series of steps and/or the steps do not need to be performed in the order shown and described with respect to FIG. 3, but the process 300 may be integrated and/or one or more steps may be performed together, simultaneously, or the steps may be performed in the order disclosed or in an alternate order.

At 305 the data attributes and/or data properties, e.g., the one or more data points, used to generate features, used for example in pertinent analytical models are identified. For example, in the field of medicine (e.g., the health field), a physician or other health worker might want to determine the probability of heart disease in a patient admitted to a hospital. To facilitate this analysis, a set of the patient data, e.g., patient attributes, taken at patient intake or from certain test results could be used to generate a corresponding feature and/or a corresponding set of features that can be sent to and/or used as input to, for example, an analytical model 190 that provides a probability of heart disease. That is, in an example, not all the data collected on the patient is relevant to or processed to generate features (feature set) by the analytical model 190 to determine the probability or range of probability that the patient has heart disease. At 305, according to an embodiment, the data properties that correlate to pertinent features used by the desired analytical models are determined/identified. It can be appreciated that identifying and/or determining the data properties and/or data attributes used to generate features will depend in large part on the underlying analytical models to be used.

FIG. 4 illustrates a representative example of data attributes or data properties 440 arranged in a column that are used to generate the features that are pertinent to an analytical model 190 to determine, for example, the probability of heart disease in a patient. It can be appreciated that more data and information is taken and input into the system and stored/saved in the patient's record 412 (212 in. FIG. 2) than illustrated in FIG. 4. In the medical example of FIG. 4, each patient record has a unique record identification (Record ID) 415, and the information on the patient is stored as a record 412 (e.g., 212 in FIG. 2) in Records 172 in the Processed Record Data Store 170. While the example of FIG. 4 is in the field of medicine and is for the purpose of determining the probability of heart disease, it can be appreciated that the system, platforms, tools, computer program products, and/or methods will have applications to other fields, for example financial domain, insurance claims, etc., and for different purposes, but in an aspect each patient, customer, account, etc. has a unique record ID 415 by which the system stores information and/or data as a record 212/412 in Records 172 in the Processed Record Data Store 170, and that the information for that patient, person, customer, account, and/or record is generally subject to being updated.

At 310, the identified data attributes or properties used to generate features are mapped to an associated set of features. An example of mapping the data properties or attributes 440 to the associated features 545 is shown in FIG. 5. For example, as shown in FIG. 5, the data properties and/or attributes 440 of Gender and Age are mapped to a feature 545, identified as Feature A, while the data attributes 440 of Weight and Height are mapped to another feature 545, identified as Feature B. Other data properties and/or attributes 440, e.g., Blood Pressure, Resting Heart Rate, Income and Race, are mapped to other features 545, e.g., Features C-F, respectfully. Accordingly, one or more data properties and/or attributes can be mapped to a single feature, and/or a single data property/attribute can be mapped to a single associated feature.

At 315 data can be loaded into the system, preferably by Bulk Load Module 165. At 320 it is determined whether the record 412 was previously processed. In an aspect the Bulk Load Module 165 determines whether the record 412 was previously processed. In an embodiment, at 320 the record ID 415 of the incoming record 212'/412' is compared to the record ID 415 of the records 212/412 in the Processed Record Data Store 170. In an aspect, the Records 172 in the Processed Record Data Store 170 are searched, and in an approach the record ID 415 of an incoming record 212'/412' is searched for a corresponding record 212/412 in the Processed Record Data Store 170. According to an approach, the Bulk Load Module 165 uses the incoming record ID 415' to determine if an incoming record 212'/412' was previously processed and stored in the Processed Record Data Store 170 by searching the Processed Record Data Store 170 for a record ID 415 that corresponds to the record ID 415' of the incoming record 212'/412'.

If it is determined that an incoming record 212'/412' was not previously processed (320: No), e.g., the record ID 415' of the incoming record 212'/410' does not match the record ID 415 of a record 212 already existing in Records 172 in the Processed Record Data Store 170 (320: No), then at 325 a new record 212"/412" is generated containing a record ID 415, e.g., a unique identifier. In an aspect, the Bulk Load Module 165 generates the new record 212"/412" containing the new record ID 415" and stores the new record 212"/412" in the Processed Record Data Store 170. Following 325, the new record 212"/412" is sent at 330 along with a list of features 415 to be generated to the Feature Generator 180 for further processing. In an aspect, the Feature Generator 180 generates the features from the Feature List 415 that was sent at 330.

If it is determined that an incoming record 212'/412' was previously processed (320: Yes), e.g., the record ID 415' of an incoming record 212'/412' matches the record ID 415 of a record 212/412 contained in Records 172 of Processed Record Data Store 172 (320: Yes), then the process 300 proceeds to 335. At 335 it is determined whether the incoming record 212'/412' matches a record 212/412 in the Processed Record Data Store 170. That is, at 335 it is determined whether the data of the incoming record 212'/412' matches the data in any of the records 212/412 in Records 172 in the Processed Record Data Store 170. So, if the incoming record 212'/412' already exists in the system (e.g., the record ID 415' already exists in the system (in the Records 172 of the Processed Record Data Store 170)), then the system checks whether the incoming data record 212'/412' matches the corresponding record 212/412 that was found in the system. In an aspect, the Bulk Load Module 165 checks whether the two records match (docs record 212'/412'=record 212/412?), and in an approach makes several comparisons to see if the records match and whether further processing is required.

If it is determined that the data in the incoming record 212'/412' matches the data in the record 212/412 already processed and existing in the system, e.g., a matching record 212/412 already exists in Records 172 in the Processed Record Data Store 170 (335: Yes), then the incoming record 212'/412' (or previous record 212/412) is discarded at 340. If, however, it is determined that the data in the incoming record 212'/412' has changed, that the data in the incoming record 212'/412' does not match the data in the record 212/412 already in the system, e.g., in the Processed Record Data Store 170 (335: No), then at 345 it is determined what data properties 440 have changed. At 350 it is determined what features 545 need to be recalculated. That is, at 345 the system determines what data properties 440 have changed, and in an embodiment the data property to feature mapping (e.g., FIG. 5) is used at 350 to determine what features 545 need recalculating because those features 545 are based upon data that has changed. In an aspect, at 350 a list of features (e.g., a Feature List) that need to be recalculated is determined. An example of a Feature List 214 is illustrated in FIG. 6, where Features 545 (e.g., features C-D) need to be recalculated because the data properties 440 of Blood Pressure and Resting Heart Rate have changed. At 355, the Feature List 214 that needs recalculating, e.g., the list of features that need to be recalculated and/or regenerated because of the changed data, is sent to the Feature Generator 180 for further processing. The record is updated at 360, and in an aspect the Bulk Load Module 165 updates the record 212/412 in the Records 172 in the Processed Record Data Store 170.

As can be appreciated, the amount of computations to be performed and hence the amount of resources and time to prepare and process data can be decreased according to method 300. More specifically, in an approach, the one or more features that need to be recalculated as a result of changed data can be reduced by method 300. The manner in which some of the process blocks of method 300 are undertaken and performed can be varied according to a number of approaches.

Figure 7:
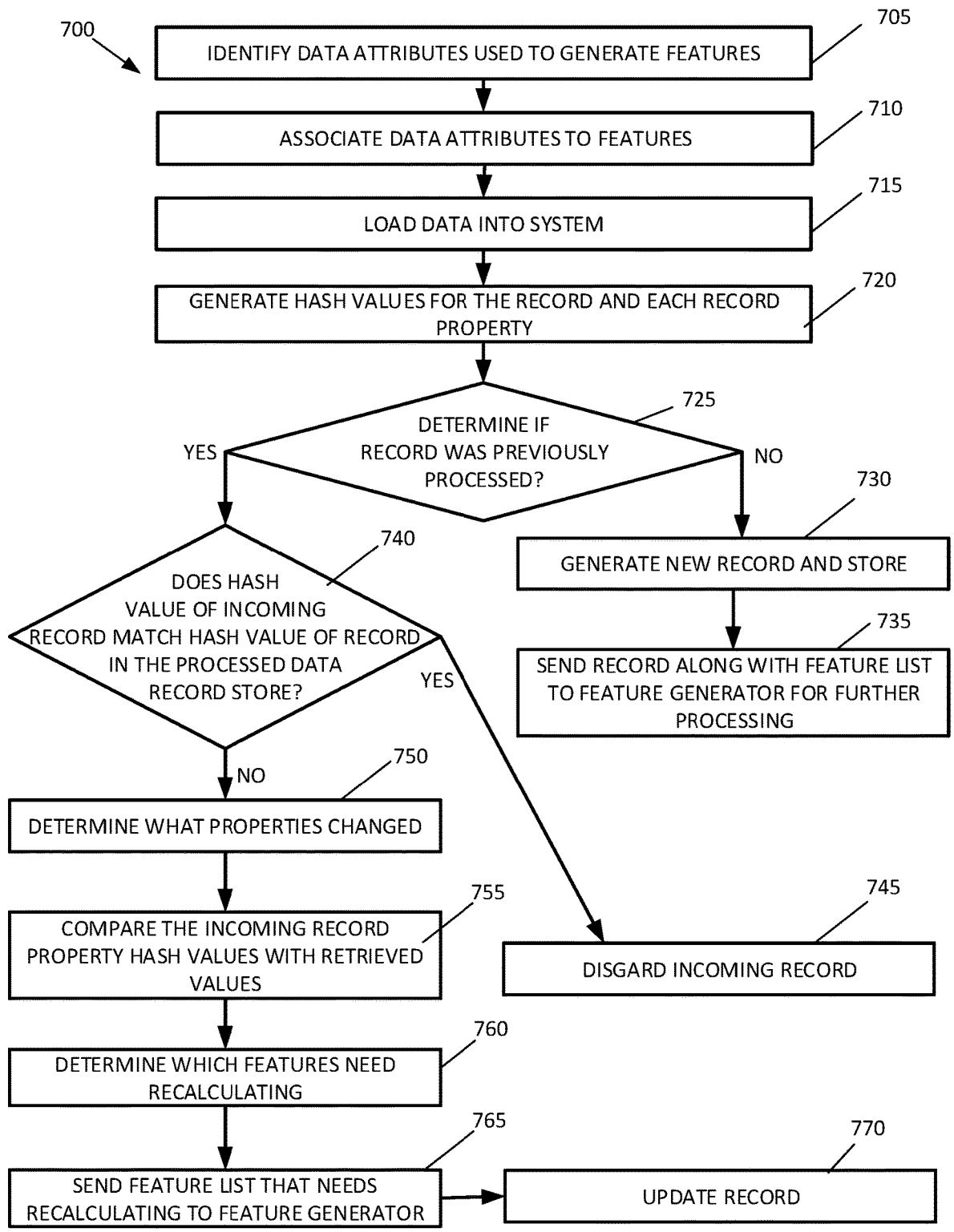
FIG. 7 diagrammatic flowchart of a method of reducing and/or restricting data processing and/or feature calculations according to another embodiment of the present disclosure.

FIG. 7 is an exemplary flowchart in accordance with an embodiment illustrating and describing a method 700 of processing data, including update data, and in an aspect restricting and/or reducing the feature calculations in a system, platform, tool, computer program product and/or method to data that has been changed, and in an aspect to data that has changed that correlates to one or more features that are pertinent to a desired analytical model. In one or more blocks, parts, and/or steps hash values are used in the process 700, however, other approaches are contemplated including an approach that is a hybrid process relying in part on hash values. While the method 700 is described for the sake of convenience and not with an intent of limiting the disclosure as comprising a series and/or a number of steps, it is to be understood that the process 700 does not need to be performed as a series of steps and/or the steps do not need to be performed in the order shown and described with respect to FIG. 7, but the process 700 may be integrated and/or one or more steps may be performed together, simultaneously, or the steps may be performed in the order disclosed or in an alternate order.

At 705 the data properties/attributes, e.g., the one or more data points, used to generate features, used for example by the relevant analytic model, are identified. That is, the input for analytical models is typically a set of features and not all data collected and/or stored in a data record is relevant to features used by the analytical models. Not all the data collected typically is relevant to or processed by the analytical model 190 and so in an aspect the data properties/attributes used to generate and/or calculate the features is determined at 705. FIG. 4 illustrates a representative example of data properties/attributes 440 arranged in a column that are used to generate the features 545 that are pertinent to a pertinent analytical model 190.

Figure 8:
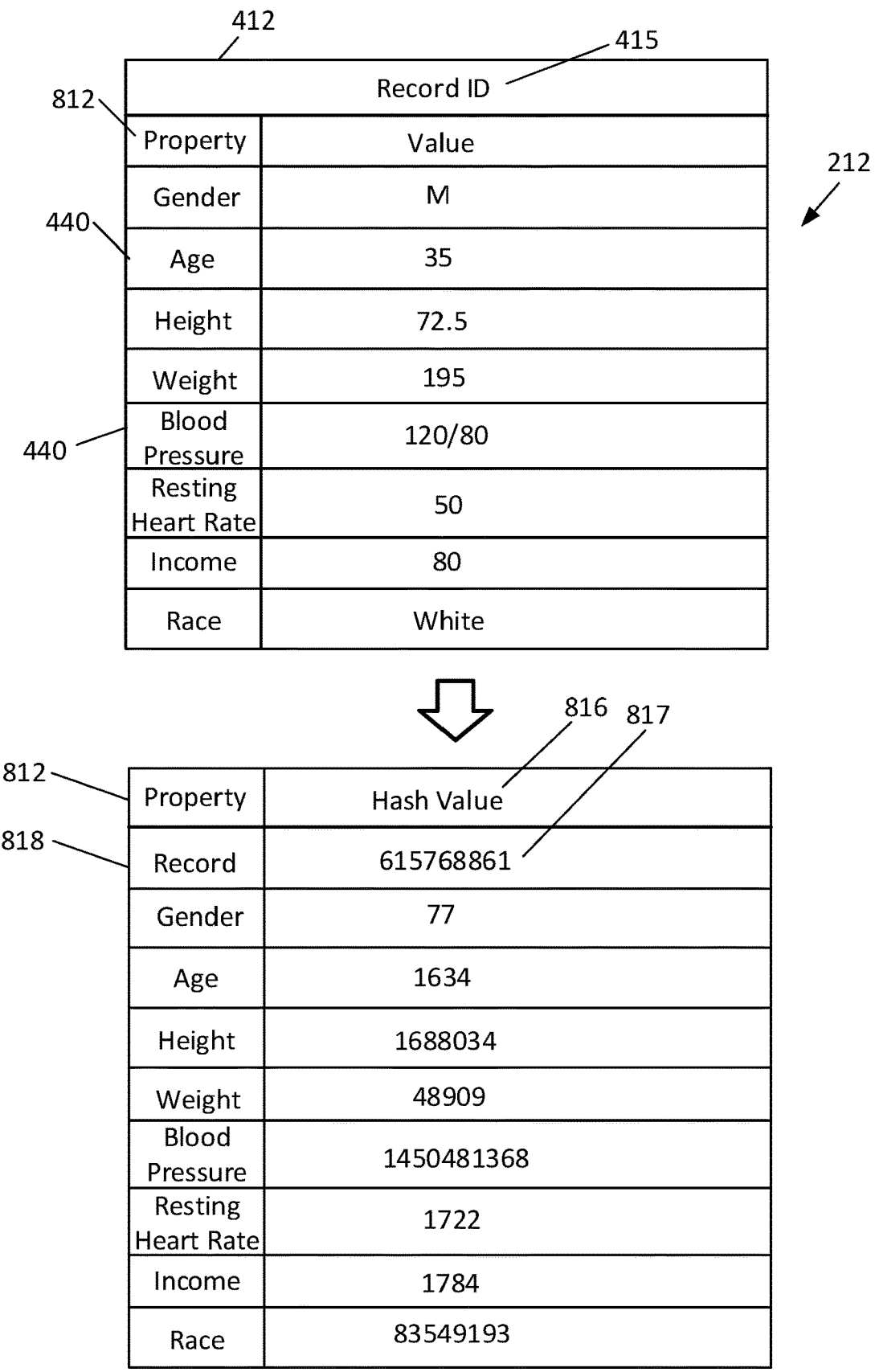
FIG. 8 illustrates providing and/or calculating hash values of data properties and/or data attributes of a record according to an embodiment of the present disclosure.

At 710, the identified data properties/attributes 440 used to generate features 545 are mapped to associated features 545 and/or set of features 545. An example of mapping the data properties/attributes 440 to the associated features 545 is shown in FIG. 5. At 715 data can be loaded into the system, preferably by Bulk Load Module 165. At 720 hash values for the record (e.g., for the cumulative record that includes all the data in the record) and for each property/attribute in the record is generated. In an embodiment, at 720 as the records are read the hash values for each record property, and for the cumulative record properties, are generated, preferably by the Bulk Load Module 165. It can be appreciated that hash value of the record 212/412 is the hash of all the data for each property/attribute 440 in the record 212/412, and that the hash of each record property 440 is a hash of each individual property 440 in the record 412. It can be appreciated that each property 440 in the record 212/412 typically includes more than the data properties/attributes 440 that are used to generate features 545. FIG. 8 illustrates an example of a record 212/412 where for each property 812 arranged in a column, including the Record 818, hash values 816 have been generated, including a hash value 817 for the record 818 (e.g., cumulative hash value of all hash values 816 for each property 812 (each property/attribute 440) in the record 212/412).

At 725 it is determined whether the incoming record 212'/412' was previously processed. In an aspect, the Bulk Load Module 165 determines whether the incoming record 212'/412' was previously processed. In an embodiment, at 725 the record ID 415 of the incoming record 212'/412' is compared to the record ID 415 of the records 212/412 in the Processed Record Data Store 170. In an aspect, the records 212/412 in Records 172 in the Processed Record Data Store 170 are searched, and in an approach the records 212/412 in Records 172 in the Processed Record Data Store 170 are searched for a record ID 415 that matches the record ID 415' of the incoming record 212'/412'. According to an approach, the Bulk Load Module 165 uses the record ID 415' of the incoming record 212'/412' to determine if a record 212/412 was previously processed by searching the Processed Record Data Store 170 for a record ID 415 that corresponds to (e.g., matches) the record ID 415' of the incoming record 212'/412'.

Figure 9:
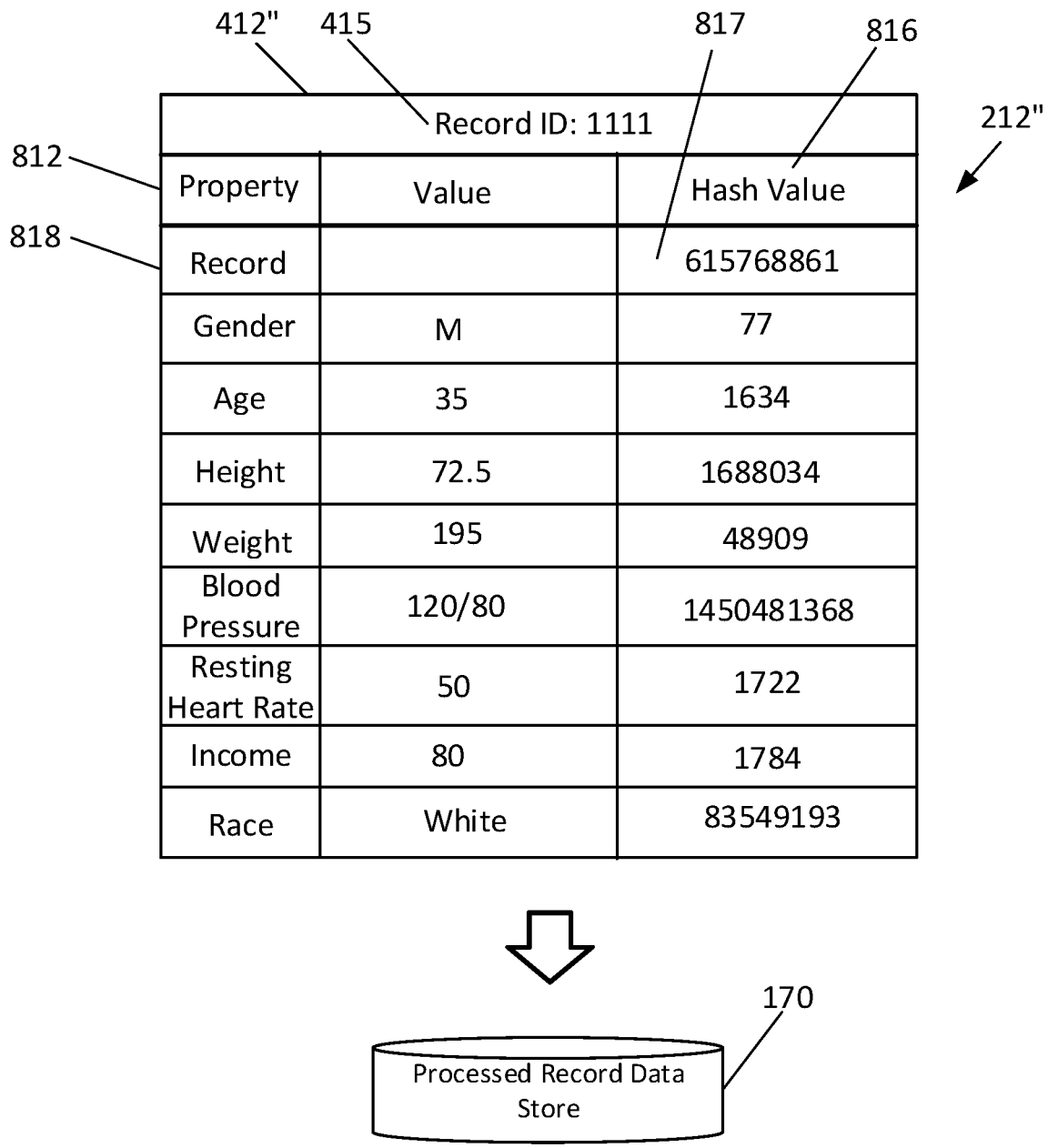
FIG. 9 illustrates storing hash values of data properties of a record and a hash value of the record in a Processed Data Record Store according to an embodiment of the present disclosure.

If it is determined that an incoming record 212'/412' was not previously processed (725: No), e.g., the record ID 415 of the incoming record 212'/412' does not match the record ID 415 of a record 212/412 in the Records 172 in the Processed Record Data Store 170 (725: No), then at 730 a new record 212"/412" is generated containing a record ID 415, e.g., a unique identifier. In an aspect, the Bulk Load Module 165 generates the new record 212"/412" containing a new record ID 415 and stores the new record 212"/412" in the Processed Record Data Store 170. In a further aspect, the new record 212"/412" includes the record hash value 817 and the property hash values 816, and the new record 212"/412" with the record hash value 817 and the hash values 816 for each of the properties 812 is stored, preferably in the Processed Record Data Store 170. FIG. 9 illustrates the new record 212"/412' including the hash values 816 that are stored in the Processed Record Data Store 170. Following 730, the new record 212"/412" is sent at 735 along with a list of features (e.g., Feature List 214) to be generated to the Feature Generator 180 for further processing. In an aspect, the Feature Generator 180 generates the features 545 from the list of features to be generated (e.g., Feature List 214) that was sent at 735.

If it is determined that an incoming record 212'/412' was previously processed (725: Yes), e.g., the record ID 415 of an incoming record 212'/412' matches the record ID 415 of a record 212 contained in Records 172 of Processed Record Data Store 170 (725: Yes), then the process 700 proceeds to 740. At 740 it is determined whether the hash value 817 of the incoming record 212'/412' matches the hash value 817 of the record 212/412 in the Processed Record Data Store 170. That is, at 740 it is determined whether the hash value 816 of all the properties 812 in the incoming record 212'/412' matches the hash value 816 of all the properties 812 in any of the records 212/412 (e.g., a record 212/412 with the matching record ID 415) in Records 172 in the Processed Record Data Store 170. So, if the record 212/412 already exists in the system (e.g., the record ID 415 already exists in the Records 172 of the Processed Record Data Store 170)), then the system checks whether the incoming data record 212'/412' matches the corresponding record 212/412 that was found in the system. In an aspect, the Bulk Load Module 165 checks whether the hash values 817 of the two records match (the hash value 817 of the incoming record 212'/412' and the hash value 817 of the corresponding record 212/412 in the Processed Record Data Store 170), and in an approach makes several comparisons to see if the records match and whether further processing is required.

If it is determined that the data in the incoming record 212'/412' matches the data in the record 212/412 already processed and existing in the system, e.g., a matching record 212/412 already exists in Records 172 in the Processed Record Data Store 170 (740: Yes), then the incoming record 212'/412' (or the existing record 212/412) is discarded at 745. That is, if the hash value 817 of the incoming record 212'/412' (see, 818 in FIGS. 8 & 9) matches the hash value 817 of the corresponding record 212/412 that is already stored in the system (740: No), then the incoming record 212'/412' is the same as the record 212/412 already in the system, so at 745 the incoming record 212'/412' (or the existing record 212/412) is discarded. In an aspect, the hash value 817 of each of the properties 812 in the incoming record 212'/412' are compared to the hash value 817 of each of the properties 812 in the matching existing record 212/412, then the incoming record 212'/412' is the same as the record 212/412 already in the system, so at 745 the incoming record 212'/412' (or existing record 212/412) is discarded.

If, however, it is determined that the incoming record 212'/412' has data and/or properties 812 that have changed, that the data (e.g., properties 812) in the incoming record 212'/412' does not match the data (e.g., the properties 812) in the record 212/412 already in the system, e.g., in the Processed Record Data Store 170 (740: No), then at 750 it is determined what properties 812 in the incoming record 212'/412' have changed. That is, if it is determined that the hash value of the incoming record 212'/412' (e.g., the cumulative hash value 717 of all the data in the incoming record 412) is not the same as the hash value of the corresponding record 212/412 already in the system (740: No), then the incoming record 212'/412' has changed and data in the incoming record 212'/412' is changed, and the process proceeds to 750 where it is determined what properties 812 in the incoming record 212'/412' have changed. The process 700 in an embodiment continues to 755 where the hash value 816 of each property 812 in the incoming record 212'/412' is compared to the hash value 816 of each property 812 retrieved from the record 212/412 already existing in the system. After it is determined what properties 812 have changed, by for example comparing hash values at 755, it is determined at 760 what features (or feature set) 545 need to re-calculated.

That is at 750, 755 the system determines what properties 812 in the incoming record 212'/412' have changed, and in an embodiment the data property 812/440 to feature 545 mapping (e.g., FIG. 5) is used to determine at 760 what features 545 need recalculating because they are based upon data that has changed. In an approach, at 760 a list of features 545 to be generated is created (e.g., a Feature List 214 is created). At 765 the Feature List 214 (see FIG. 6) that needs recalculating, e.g., the list of features 545 that need to be recalculated and/or regenerated because the feature 545 is associated with changed data properties 440/812, is sent to the Feature Generator 180 for further processing. It can be appreciated that in an embodiment only the features 545 are recalculated that are based upon data properties 440/812 that have changed, and in an aspect only features 545 are calculated that are based upon data properties 440/812 that have changed that are associated with or correlate to features 545 used, for example, by the desired analytical models. The record is updated at 770, and in an aspect the Bulk Load Module 165 updates the record 212/412 in the Records 172 in the Processed Record Data Store 170, including the new record hash value 817 and each of the property hash values 816. As can be appreciated, the amount of computations to be performed and hence the amount of resources and time to prepare and process data, including the amount of features that need to be recalculated, can be decreased according to method 700.

Figure 10:
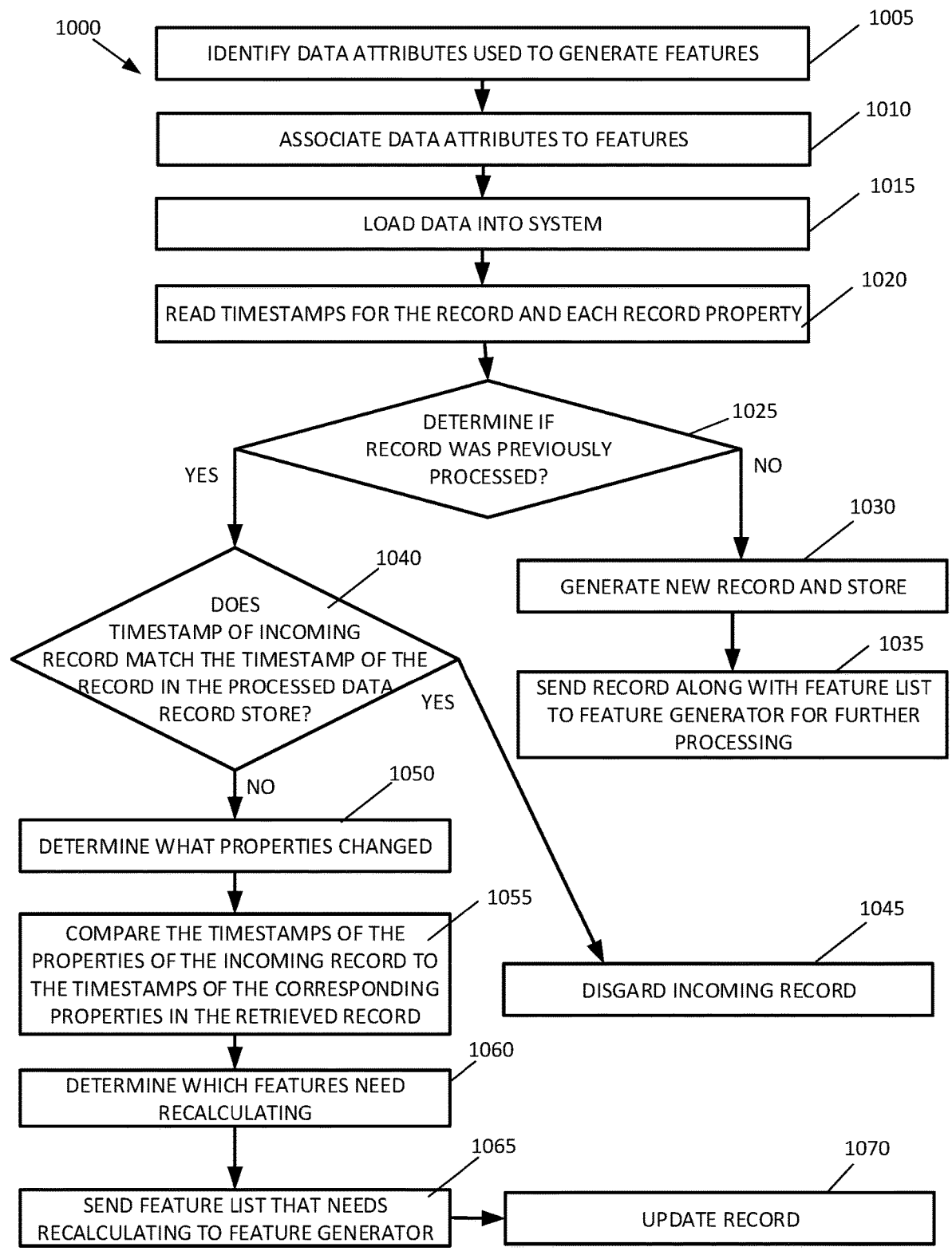
FIG. 10 illustrates a diagrammatic flowchart of a method of reducing and/or restricting data processing and/or feature calculations according to a further embodiment of the present disclosure.

FIG. 10 is an exemplary flowchart in accordance with an embodiment illustrating and describing a method 1000 of processing data, including update data, and in an aspect restricting and/or reducing the feature calculations to data that has been changed, and in an approach restricting and/or reducing calculations to properties that have changed that correlate to features used by desired analytical models. In one or more blocks, parts, and/or steps time stamps are used in the process 1000. While the method 1000 is described for the sake of convenience and not with an intent of limiting the disclosure as comprising a series and/or a number of steps, it is to be understood that the process 1000 does not need to be performed as a series of steps and/or the steps do not need to be performed in the order shown and described with respect to FIG. 10, but the process 900 may be integrated and/or one or more steps may be performed together, simultaneously, or the steps may be performed in the order disclosed or in an alternate order.

At 1005 the data properties/attributes 440, e.g., the one or more data points, used to generate one or more features 545, used for example by the relevant analytic model, are identified. The input for analytical models is typically a set of features 545 and not all data properties/attributes 440 collected are relevant to features 545 used, for example, by the desired analytical models. That is, in an example, not all the data properties/attributes 440 that are collected are relevant to or processed by the analytical model 190 and so the data properties/attributes 440 used to generate and/or calculate the relevant features 545 are determined and/or identified at 1005. The data properties/attributes 440 in a record 212/412 that are relevant to generate the features 545 typically changes with the analytical model utilized in performing the data analytics. FIG. 4 illustrates a representative example of data properties and/or attributes 440 arranged in a column that are used to generate the features 545 that are relevant to a pertinent analytical model 190.

At 1010, the identified data properties/attributes 440/812 used to generate one or more features 545 used by the analytical models are mapped to an associated feature 545 or set of features 545. An example of mapping the data properties/attributes 440/812 to the associated features 545 is shown in FIG. 5. At 1015 data can be loaded into the system, preferably by Bulk Load Module 165. Process 1000 uses time stamps as an approach to reducing and/or restricting feature calculations. This requires timestamps associated with the records 212/412, including timestamps for each of the one or more data properties 440/812 in the record 212/412. In an embodiment the source system, e.g., system 120 in FIG. 1, sends a record 212/412 and associated timestamps 1113 as illustrated in FIG. 11. The time stamps 1113 indicate when the record 212/412 and record properties 812 were last updated. At 1020 the system reads the record 212/412 and the timestamps 1113 for each of the properties 812, preferably by the Bulk Load Module 165. FIG. 11 illustrates an example of an incoming record 212'/412' where for each property 812 arranged in a column, time stamps 1113 for each of the properties 812 are read as well.

At 1025 it is determined whether the incoming record 212'/412' was previously processed. In an aspect, the Bulk Load Module 165 determines whether the incoming record 212'/412' was previously processed. In an embodiment, at 925 the record ID 415 of the incoming record 212'/412' is compared to the record ID 415 of the records 212/412 in the Processed Record Data Store 170. In an aspect, the records 212/412 in Records 172 in the Processed Record Data Store 170 are searched, and in an approach the records 212/412 Records 172 in the Processed Record Data Store 170 are searched for a record ID 415 that corresponds to the record ID 415 of the incoming record 212'/412'. According to an approach, the Bulk Load Module 165 uses the record ID 415 to determine if an incoming record 212'/412' was previously processed by searching Records 172 in the Processed Record Data Store 170 for a record ID 415 that corresponds to the record ID 415 of the incoming record 212'/412'.

If it is determined that an incoming record 212'/412' was not previously processed (1025: No), e.g., the record ID 415 of the incoming record 212'/412' does not match the record ID 415 of a record 212/412 in Records 172 in the Processed Record Data Store 170 (1025: No), then at 1030 a new record 212"/412" is generated containing a record ID 415", e.g., a unique identifier. In an aspect, the Bulk Load Module 165 generates the new record 212"/412" containing the new record ID 415" and stores the new record 212"/412" in the Processed Record Data Store 170. In a further aspect, the new record 212"/412" includes time stamp 1113 as shown by 1114 and time stamps 1113 for each of the properties 812. FIG. 12 illustrates the incoming record 212'/412' including the properties, the property values, and time stamps 1113 being stored as new record 212"/412" in the Processed Record Data Store 170. Following 1030, the new record 212"/412" is sent at 1035 along with a list of features to be generated (e.g., Feature List 214) to the Feature Generator 180 for further processing. In an aspect, the Feature Generator 180 generates the features from the list of features to be generated (e.g., Feature List 214) that was sent at 1035.

If it is determined that an incoming record 212'/412' was previously processed (1025: Yes), e.g., the record ID 415 of an incoming record 212'/412' matches the record ID 415 of a record 212/412 contained in Records 172 of Processed Record Data Store 170 (1025: Yes), then the process 1000 proceeds to 1040. At 1040 it is determined whether the timestamp 1113 of the incoming record 212'/412' matches the timestamp 1113 of the record 212/412 in the Processed Record Data Store 170. That is, at 1040 it is determined whether the timestamp 1114 of the record 212/412 in the Processed Data Store 170 is earlier than the timestamp 1114 of the incoming record 212'/412'. So, if the record already exists in the system (e.g., the record ID 415 already exists in the system (in the Records 172 of the Processed Record Data Store 170)), then the system checks whether the incoming data record 212'/412' matches the corresponding record 212/412 that was found in the system. In an aspect, the Bulk Load Processor checks whether the timestamps of the two records match (the timestamp 1114 of the incoming record 212'/412', and the timestamp 1114 of the corresponding record 212/412 in the Processed Record Data Store 170), and in an approach makes several comparisons to see if the records match and whether further processing is required.

If it is determined that the incoming record 212'/412' is the same as the record 212/412 that already exists in the system, e.g., a matching record 212/412 already exists in Records 172 in the Processed Record Data Store 170 (1040: Yes), then the incoming record 212'/412' (or the existing record 212/412) is discarded at 1045. That is, if the timestamp 1114 of the incoming record 212'/412' matches (or is earlier than) the timestamp 1114 of the corresponding record 212/412 that is already stored in the system (1040: No), then the incoming record 212'/412' is the same as the record 212/412 already in the system, including all the property values, so at 1045 the incoming record 212'/412' (or the existing record 212/412) is discarded (e.g., one record is retained by the system in storage (the Processed Record Data Store 170).

If, however, it is determined that the incoming record 212'/412' has properties that have changed (1040: No), that the data in the incoming record 212'/412' does not match the data in the record 212/412 already in the system, e.g., in the Processed Record Data Store 170 (1040: No), then at 1050 it is determined what properties have changed. That is, if it is determined that the timestamp 1114 of the incoming record 212'/412' (e.g., the timestamp 1114 of the record ID 415' of the incoming record 212'/412') is not the same as the timestamp 1114 of the corresponding record 212/412 already in the system (1040: No), then the incoming record 212'/412' has changed and data in the incoming record 212'/412' is changed, and the process proceeds to 1050 where it is determined what properties 812 in the incoming record 212'/412' have changed. The process 1000 in an embodiment continues to 1055 where the timestamp 1113 of each property 812 in the incoming record 212'/412' is compared to the timestamp 1113 of each property 812 retrieved from the record 212/412 already existing in the system.

After it is determined what properties 812 in the incoming record 412 have changed, by for example at 1055 comparing timestamps 1113, it is determined at 1060 what features 545 need to re-calculated. That is at 1050, 1055 the system determines what properties 812 of the incoming record 212'/412' have changed, and in an embodiment the property 440/812 to feature 545 mapping (e.g., FIG. 5) is used to determine at 1060 what features 545 correlate to data properties 440/812 that has changed, and accordingly the features 545 that need recalculating. In an aspect, a list of features 545 to be recalculated (e.g., a Feature List 214) is created at 1060. At 1065 the Feature List 214 that needs recalculating, e.g., the list of features 545 that need to be recalculated and/or regenerated, because the feature 545 is associated with changed data, e.g., a data property 440/812 value that has changed, is sent to the Feature Generator 180 for further processing. It can be appreciated that in an embodiment only the features 545 are recalculated that are based upon data property 440/812 that have changed. For example, in an aspect only features 545 that are used in desired and/or pertinent analytical models and correlate with data properties 440/812 that changed are identified and included in the Feature List 214. The record is updated at 1070, and in an aspect the Bulk Load Module 165 updates the record 212/412 in Records 172 in the Processed Record Data Store 170, including in an aspect updating the record timestamp value. As can be appreciated, the amount of computations to be performed and hence the amount of resources and time to prepare and process data, including the amount of features 545 that need to be recalculated, can be decreased according to method 1000.

Another approach for restricting and/or reducing feature calculations can be accomplished by identifying data properties 440/812 that never change, and/or are likely to change minimally. For example, in one or more embodiments, properties 440/812 (and their associated features 545) that are unlikely to change, for example, a customer's or patient's race, and/or properties that are only going to change minimally, for example height, can be marked as generate once.

Figure 13:
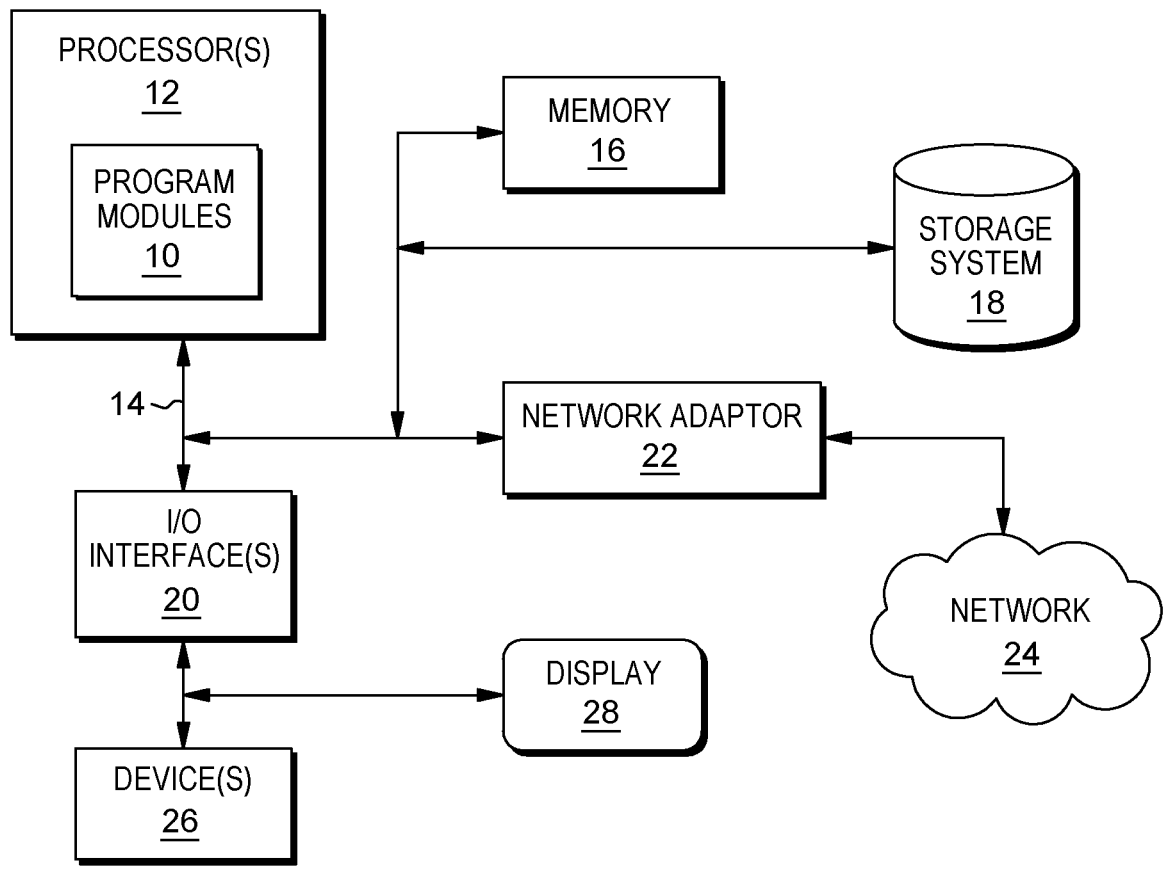
FIG. 13 illustrates yet another exemplary system and/or platform in accordance with the present disclosure.

FIG. 13 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by the computer system, and it may include both volatile and non-volatile media, removable and non-removable media.

Memory 16 (sometimes referred to as system memory) can include computer readable media in the form of volatile memory, such as random-access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method to reduce an [the] amount of processing of electronic data comprising:

identifying one or more electronic data properties used to generate one or more features used as input to one or more pertinent electronic data analytic models, wherein the one or more features comprise electronic data that has been processed into a form for use by and input into the one or more pertinent electronic data analytic models, wherein processing the electronic data into a form for use by and input into the one or more pertinent electronic data analytic models comprises at least one of a group consisting of: filtering, selecting, transforming, and combinations thereof, the electronic data;

associating the one or more identified electronic data properties to one or more corresponding features to create a data property to feature mapping;

loading a plurality of incoming electronic data records;

determining whether an incoming electronic data record of the plurality of incoming records is a previously processed electronic data record;

storing, in response to an incoming electronic data record not being a previously processed electronic data record, the incoming electronic data record as a new electronic data record;

using the data property to feature mapping to prepare a list of new features to generate based upon the electronic data stored in the new electronic data record;

generating one or more features for the stored new electronic data record based upon the prepared list of new features to generate;

determining, in response to an incoming electronic data record being a previously processed electronic data record, whether the incoming electronic data record matches the previously processed electronic data record;

discarding, in response to the incoming electronic data record matching a previously processed electronic data record, one of the incoming electronic data record or the previously processed electronic data record;

identifying, in response to the incoming electronic data record not matching the previously processed electronic data record, one or more electronic data properties in the incoming electronic data record that have changed;

determining, in response to identifying one or more electronic data properties in the incoming electronic data record that have changed, one or more corresponding features associated with the one or more identified electronic data properties in the incoming electronic data record that have changed by using the data property to feature mapping to generate a list of features to regenerate that corresponds only to the one or more identified electronic data properties in the incoming electronic data record that have changed;

generating only the one or more corresponding features associated with the one or more identified electronic data properties in the incoming electronic data record that have changed thereby reducing an amount of feature calculations generated comprises generating only the features identified on the list of features to regenerate;

updating the previously processed electronic data record with the one or more electronic data properties that have changed or storing the incoming electronic data record; and inputting in and utilizing by the one or more pertinent electronic data analytic models only the one or more corresponding features associated with the one or more identified electronic data properties in the incoming electronic data record that have changed to determine a probability for an entity in a particular field thereby reducing the amount of processing and calculations by an electronic data analytic model reruns.

2. The method according to claim 1, wherein determining whether an incoming electronic data record is a previously processed electronic data record comprises searching previously processed electronic data records for a unique record identifier that matches a unique record identifier of the incoming electronic data record.

3. The method according to claim 2, wherein searching previously processed electronic data records for a unique record identifier that matches a unique record identifier of the incoming electronic data record comprises comparing a unique record identifier of the incoming electronic data record to a unique record identifiers of previously processed electronic data records.

4. The method according to claim 1, further comprising generating a plurality of hash values, one for each of a plurality of electronic data properties in the incoming electronic data record and a cumulative hash value associated with each of the plurality of hash values generated for the plurality of electronic data properties in the incoming electronic data record, and wherein determining whether the incoming electronic data record matches a previously processed electronic data record further comprises determining whether the cumulative hash value of the incoming electronic data record is the same as a cumulative hash value of the previously processed electronic data record.

5. The method according to claim 4, further comprising generating a hash value for each of all the electronic data properties in the incoming electronic data record and a cumulative hash value associated with all the hash values for all the electronic data properties in the incoming electronic data record.

6. The method according to claim 4, wherein determining whether the cumulative hash value of the incoming electronic data record is the same as a cumulative hash value of the previously processed electronic data record comprises comparing the cumulative hash value of the incoming electronic data record to the cumulative hash value generated for the previously processed electronic data record.

7. The method according to claim 4, wherein identifying one or more electronic data properties in the incoming electronic data record that have changed comprises determining whether, in response to the cumulative hash value of the incoming electronic data record not being the same as the cumulative hash value of the previously processed electronic data record, the hash values of any of the plurality of electronic data properties in the incoming electronic data record are different than the hash value of any of a plurality of corresponding electronic data properties in the previously processed electronic data record, wherein determining that the hash values of any of the plurality of electronic data properties in the incoming electronic data record are different than the hash value of any of the plurality of the corresponding electronic data properties in the previously processed electronic data record, identifies the one or more electronic data properties in the incoming electronic data record that have changed.

8. The method according to claim 1, wherein determining one or more corresponding features associated with the one or more identified electronic data properties that have changed comprises checking the one or more electronic data properties in the incoming electronic data record that have changed for correspondence to the one or more electronic data properties associated with the one or more corresponding features, and generating the list of one or more corresponding features to generate.

9. The method according to claim 1, further comprising providing a timestamp for the incoming electronic data record and a timestamp for a plurality of electronic data properties in the incoming electronic data record, and wherein determining whether the incoming electronic data record matches the previously processed electronic data record further comprises determining whether the timestamp of the incoming electronic data record is the same as a timestamp of the previously processed electronic data record.

10. The method according to claim 9, wherein identifying one or more electronic data properties in the incoming electronic data record that have changed comprises determining, in response to the timestamp of the incoming electronic data record not being the same as a timestamp of the previously processed electronic data record, a timestamp of each the plurality of electronic data properties of the incoming electronic data record that is different than a timestamp of each of a plurality of corresponding electronic data properties in the previously processed electronic data record, wherein the timestamps of each of the plurality of electronic data properties that are different than the timestamps of the plurality of corresponding electronic data properties in the previously processed electronic data record identifies the one or more electronic data properties in the incoming electronic data record that have changed.

11. A computer programming product comprising instructions embedded in a non-transitory computer readable storage medium that, when executed by at least one hardware processor, configure the at least one hardware processor to:
identify one or more electronic data properties used to generate one or more features used as input to one or more pertinent data analytic models, wherein the one or more features comprise electronic data that has been processed into a form for use by and input into the one or more pertinent electronic data analytic models, wherein the processing of the electronic data comprises at least one of a group consisting of: filtering, selecting, transforming, and combinations thereof, the electronic data;
associate the one or more identified electronic data properties to one or more corresponding features to create a data property to feature mapping;
load a plurality of incoming electronic data records;
determine whether an incoming electronic data record of the plurality of incoming electronic data records is a previously processed electronic data record;
store, in response to an incoming electronic record not being a previously processed electronic data record, the incoming record as a new electronic data record;
use the data to feature mapping to prepare a list of new features to generate based upon the electronic data stored in the new electronic data record;
generate one or more features for the stored new electronic data record based upon the prepared list of new features to generate;
determine, in response to an incoming electronic data record being a previously processed electronic data record, whether the incoming electronic data record matches the previously processed electronic data record;
discard, in response to the incoming electronic data record matching a previously processed electronic data record, one of the incoming electronic data record or the previously processed electronic data record;

identify, in response to the incoming electronic data record not matching the previously processed electronic data record, one or more electronic data properties in the incoming electronic data record that have changed;

determine, in response to identifying one or more electronic data properties in the incoming electronic data record that have changed, one or more corresponding features associated with the one or more identified electronic data properties in the incoming electronic data record that have changed by using the data property to feature mapping to generate a list of features to generate that corresponds only to the one or more identified electronic data properties in the incoming electronic data record that have changed;

generate only the one or more corresponding features associated with the one or more identified electronic data properties in the incoming electronic data record that have changed thereby reducing an amount of feature calculations generated comprising generating only the features identified on the list of features to regenerate;

update the previously processed electronic data record with the one or more electronic data properties that have changed or storing the incoming electronic data record; and input in and utilize by the one or more pertinent electronic data analytic models only the one or more corresponding features associated with the one or more identified electronic data properties in the incoming electronic data record that have changed to determine a probability for an entity in a particular field thereby reducing an amount of processing and calculations by an electronic data analytic model.

12. The computer programming product according to claim 11, further comprising instructions that, when executed configure the at least one hardware processor to, search previously processed electronic data records for a unique record identifier that matches a unique record identifier of the incoming electronic data record.

13. The computer programming product according to claim 11, wherein determining whether the incoming electronic data record matches a previously processed electronic data record further comprises instructions that, when executed configure the at least one hardware processor to, compare one of a cumulative hash value or a timestamp of an incoming electronic data record to a cumulative hash value or a timestamp of the previously processed electronic data record.

14. The computer programming product according to claim 11, wherein identifying one or more electronic data properties in the incoming electronic data record that have changed comprises instructions that, when executed configure the at least one hardware processor to, determine hash values or timestamps of any of the plurality of electronic data properties in the incoming electronic data record that are different than a hash value or timestamp of any of a plurality of corresponding electronic data properties in the previously processed electronic data record, wherein different hash values or timestamps in the incoming electronic data record, identify the one or more electronic data properties in the incoming electronic data record that have changed.

15. A computer-implemented system to reduce an amount of processing performed to update electronic data records comprising:

a non-transitory memory storage device storing program instructions; and a hardware processor having circuitry and logic to execute said program instructions, wherein the hardware processor is in communication with said memory storage device and in response to executing said program instructions is configured to:

identify one or more electronic data properties used to generate one or more features used as input to one or more pertinent data analytic models, wherein the one or more features comprise electronic data that has been processed into a form for use by and input into the one or more pertinent electronic data analytic models, wherein the processing of the electronic data comprises at least one of a group consisting of: filtering, selecting, transforming, and combinations thereof, the electronic data;

associate the one or more identified electronic data properties to one or more corresponding features to create a data property to feature mapping;

load a plurality of incoming electronic data records into the system;

determine whether an incoming electronic data record of the plurality of incoming electronic data records is a previously processed electronic data record;

store, in response to an incoming electronic data record not being a previously processed electronic data record, the incoming record as a new electronic data record;

use the data property to feature mapping to prepare a list of new features to generate based upon the electronic data stored in the new electronic data record;

generate one or more features for the stored new electronic data record based upon the prepared list of new features to generate;

determine, in response to an incoming electronic data record being a previously processed electronic data record, whether the incoming electronic data record matches the previously processed electronic data record;

discard, in response to the incoming electronic data record matching a previously processed electronic data record, one of the incoming electronic data record or the previously processed electronic data record;

identify, in response to the incoming electronic data record not matching the previously processed electronic data record, one or more electronic data properties in the incoming electronic data record that have changed;

determine, in response to identifying one or more electronic data properties in the incoming electronic data record that have changed, one or more corresponding features associated with the one or more identified electronic data properties in the incoming electronic data record that have changed by using the data property to mapping feature to generate a list of features to regenerate that corresponds only to the one or more identified electronic data properties in the incoming electronic data record that have changed;

generate only the one or more corresponding features associated with the one or more identified electronic data properties in the incoming electronic data record that have changed thereby reducing an amount of feature calculations generated comprises generating only the features identified on the list of features to regenerate;

update the previously processed electronic data record with the one or more electronic data properties that have changed or storing the incoming electronic data record; and input in and utilize by the one or more pertinent electronic data analytic models only the one or more corresponding features associated with the one or more identified electronic data properties in the incoming electronic data record that have changed to determine a probability for an entity in a particular field thereby reducing the amount of processing and calculations by an electronic data analytic model reruns.

\* \* \* \* \*